United States Patent [19]

Miyata et al.

[11] Patent Number: 5,670,770
[45] Date of Patent: Sep. 23, 1997

[54] PORTABLE TERMINAL APPARATUS

[75] Inventors: Maki Miyata, Yokohama; Akihiko Iura; Akio Murata, both of Kawasaki, all of Japan

[73] Assignee: Fujitsu Limited, Kawasaki, Japan

[21] Appl. No.: 508,934

[22] Filed: Jul. 28, 1995

[30] Foreign Application Priority Data

Jan. 11, 1995 [JP] Japan ................................. 7-002814

[51] Int. Cl.[6] ............................................. G06K 7/10
[52] U.S. Cl. ................................... 235/462; 235/472
[58] Field of Search ............................ 235/472, 462

[56] References Cited

U.S. PATENT DOCUMENTS

| | | | |
|---|---|---|---|
| 5,218,187 | 6/1993 | Koenck et al. | 235/472 X |
| 5,227,617 | 7/1993 | Christopher et al. | 235/472 X |
| 5,306,900 | 4/1994 | Metlitsky et al. | 235/472 X |
| 5,321,246 | 6/1994 | Shepard et al. | 235/472 |

*Primary Examiner*—Donald T. Hajec
*Assistant Examiner*—Jeffrey R. Filipek

*Attorney, Agent, or Firm*—Armstrong, Westerman, Hattori, McLeland & Naughton

[57] ABSTRACT

The invention provides a portable terminal apparatus for use to read information from an object of reading such as a bar code and process the information, which is improved in that a trigger key of an optical reading unit is located so as to be used readily by an operator to assure a high degree of operability. The portable terminal apparatus includes an apparatus body, an inputting section provided on the apparatus body for inputting processing information including data and an operation instruction, and an optical reading unit mounted on the apparatus body for irradiating light upon a reading object and receiving reflected light from the reading object to obtain read information of the reading object. The portable terminal apparatus is additionally provided with a reading function as the optical reading unit is mounted integrally on the apparatus body. A trigger key is allocated on the inputting section of the apparatus body for being manually operated to start a reading operation by the optical reading unit.

6 Claims, 6 Drawing Sheets

PORTABLE TERMINAL APPARATUS

BACKGROUND OF THE INVENTION

1. Field of the Invention

This invention relates to a portable terminal apparatus for use to read information from an object of reading such as a bar code and process the information.

2. Description of the Related Art

In recent years, to commodities dealt with in such stores as mass-sales stores, convenience stores or supermarkets, bar codes including information regarding the commodities are applied.

A manager of a store reads, using a portable terminal apparatus having a scanning function of reading a bar code, bar cord information applied to a commodity and performs information processing and so forth of the thus read bar code information to perform merchandise control or warehousing management including taking in and out of commodities in the store.

Such a portable terminal apparatus as described above includes an optical scanner unit (optical reading unit) which performs a scanning operation to irradiate light upon a bar code and receive reflected light from the bar code to obtain bar code information, and an apparatus body which is connected to the optical scanner unit by way of a cable or the like and processes information based on bar code information obtained from the optical scanning unit.

In the portable terminal apparatus, an apparatus body usually has an inputting section such as ten keys for inputting data or an operation instruction, and an operator can perform predetermined information processing by way of manual operation of the inputting section. Meanwhile, the optical scanner unit usually includes a trigger key, and reading is started when the trigger key is depressed.

Accordingly, upon operation of the portable terminal apparatus, an operator grasps the apparatus body with one hand and grasps the optical scanner unit with the other hand, and performs manual operation of the inputting section and manual operation of the trigger key of the optical scanner unit side by side with each other. Consequently, both hands are always busy, and it is difficult to operate the apparatus body after data are collected using the optical scanner unit, and this degrades the operability of the portable terminal apparatus.

Thus, it has been proposed to develop, different from such usual portable terminal apparatus, an apparatus body and an optical scanner unit, which can be mounted integrally onto the apparatus body, separately from each other and integrate the apparatus body and the optical scanner unit with each other to facilitate operation of the apparatus body.

However, the portable terminal apparatus wherein the optical scanner unit and the apparatus body are integrated with each other so that it may additionally have a scanning function has a subject to be solved in that the operability is degraded depending upon the mounting position of the trigger key of the optical scanner unit.

SUMMARY OF THE INVENTION

It is an object of the present invention to provide a portable terminal apparatus wherein a trigger key of an optical reading unit is located so as to be used readily by an operator to assure a high degree of operability.

In order to attain the object described above, according to the present invention, there is provided a portable terminal apparatus, comprising an apparatus body, an inputting section provided on the apparatus body for inputting processing information including data and an operation instruction, an optical reading unit mounted on the apparatus body for irradiating light upon a reading object and receiving reflected light from the reading object to obtain read information of the reading object, the portable terminal apparatus being additionally provided with a reading function as the optical reading unit is mounted integrally on the apparatus body, and a trigger key allocated on the inputting section of the apparatus body for being manually operated to start a reading operation by the optical reading unit.

In the portable terminal apparatus, as the optical reading unit is integrally mounted on the apparatus body, the reading function is additionally provided to the portable terminal apparatus. In particular, the optical reading unit irradiates light upon a reading object and receives reflected light from the reading object to read information from the reading object. Since the trigger key which is manually operated when such reading operation of the optical reading unit is to be started is allocated on the inputting section of the apparatus body, the operator can perform the manual operation of the trigger key on the inputting section. When the trigger key is operated, such trigger key operation information is stored into the register, and while the trigger key operation information is stored in the register, the optical reading unit is driven by the reading operation driving section to perform a reading operation.

With the portable terminal apparatus, since the trigger key which is manually operated when such reading operation of the optical reading unit is to be started is allocated on the inputting section of the apparatus body, the operator can manually operate the trigger key easily. Consequently, the portable terminal apparatus is advantageous in that the operability can be improved very much.

The portable terminal apparatus may be constructed such that the inputting section includes a ten key set, and a function as the trigger key is allocated to at least one of keys of the ten key set so that the key may serve also as the trigger key, or alternatively such that it further comprises a display section provided on the apparatus body for displaying a touch panel as the inputting section thereof, and the trigger key is allocated to the touch panel. In either case, the operation can perform the manual operation of the trigger key on the inputting section. Also here, since the trigger key which is manually operated when such reading operation of the optical reading unit is to be started is allocated on the inputting section of the apparatus body, the operator can operate the trigger key easily. Consequently, the portable terminal apparatus is advantageous in that the operability can be improved very much.

The portable terminal apparatus may further comprise a register for storing trigger key operation information when the trigger key is operated, a reading operation driving section for causing the optical reading unit to perform the reading operation while the trigger key operation information is stored in the register, a timer for counting a time elapsed after the trigger key operation information is stored into the register, and a resetting processing section for erasing the trigger key operation information stored in the register when the elapsed time counted by the timer exceeds a supervisory time or when read information of the reading object is obtained by the reading operation of the optical reading unit within the supervisory time. In the portable terminal apparatus, the timer counts a time elapsed after trigger operation information is stored into the register, and when the elapsed time counted by the timer exceeds the supervisory time or when read information of a reading object is obtained by a reading operation of the optical reading unit within the supervisory time, the trigger operation information stored in the register is erased by the resetting processing section.

The optical reading unit may include a trigger key for exclusive use for being operated to start a reading operation by the optical reading unit, the trigger key for exclusive use having the same function as that of the trigger key allocated on the inputting section. Here, since the trigger key for exclusive use has the same function as that of the trigger key allocated on the inputting section, the operator can start a reading operation by manual operation of the trigger key for exclusive use similarly as in a usual portable terminal apparatus. Thus, the operator can alternatively use the trigger key for exclusive use or the trigger key allocated on the inputting section depending upon the situation, and consequently, the portable terminal apparatus is advantageous in that the operability can be improved very much.

Further objects, features and advantages of the present invention will become apparent from the following detailed description when read in conjunction with the accompanying drawings in which like parts or elements are denoted by like reference characters.

Figure 1:
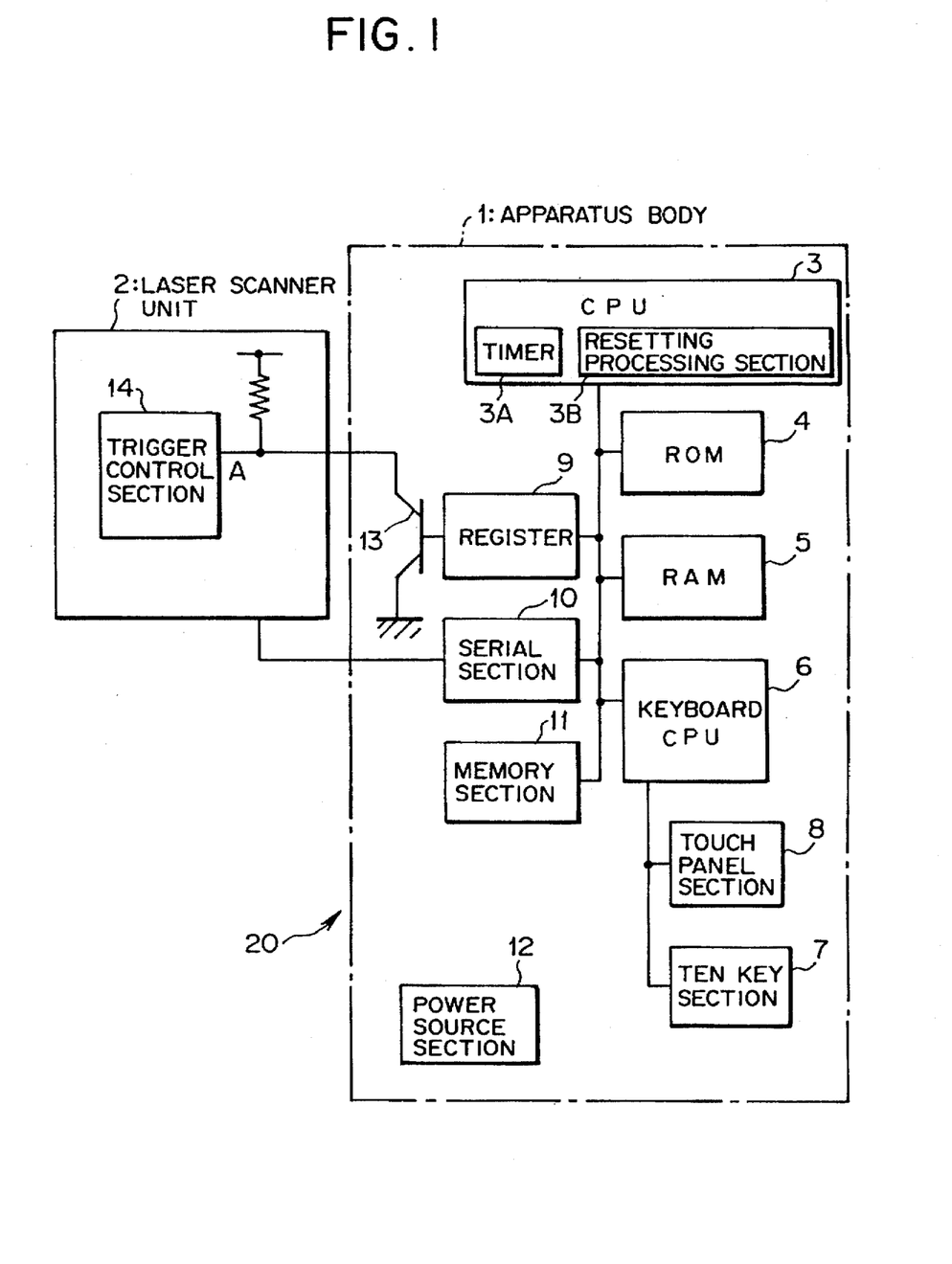
FIG. 1 is a block diagram of a portable terminal apparatus showing a first preferred embodiment of the present invention.
Figure 2:
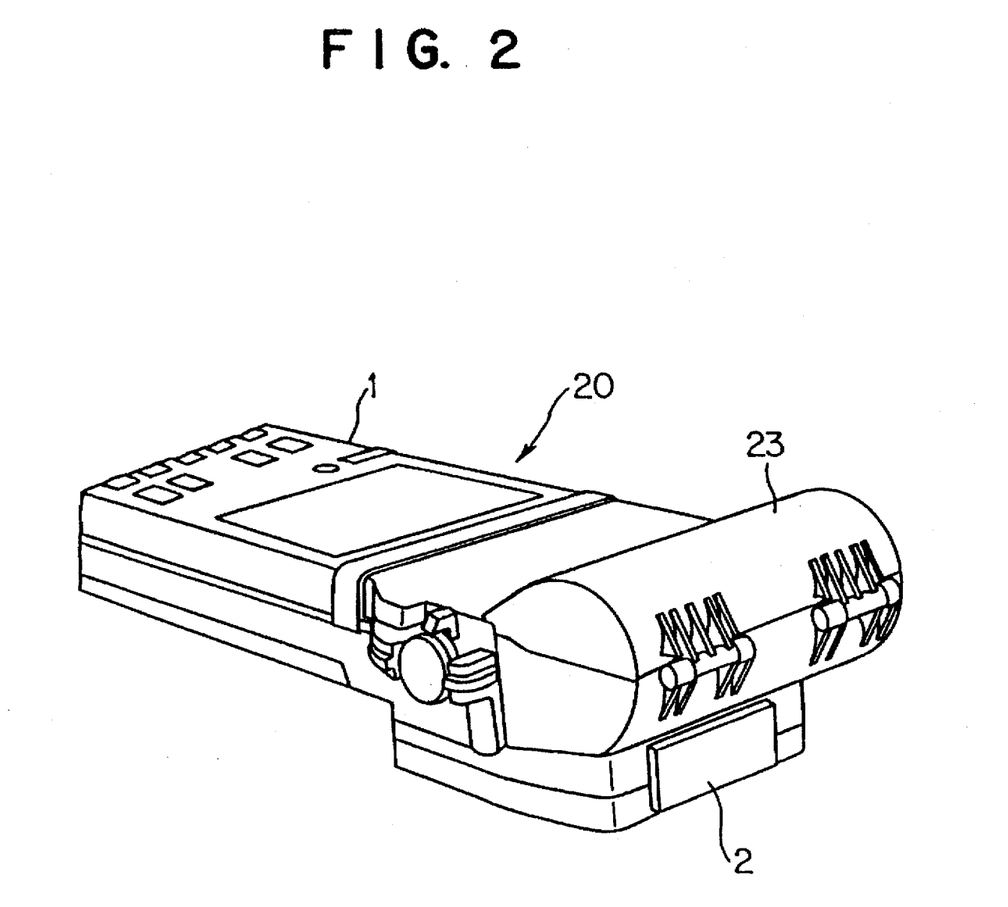
FIG. 2 is a perspective view of the portable terminal apparatus shown in FIG. 1 when an optical scanner unit and an apparatus body are integrated with each other.

DESCRIPTION OF THE PREFERRED EMBODIMENTS a. First Embodiment of the Invention Referring first to FIG. 1, there is shown in block diagram a portable terminal apparatus according to a first preferred embodiment of the present invention. Referring also to FIG. 2, the portable terminal apparatus is generally denoted at 20 and includes an apparatus body 1, and a laser scanner unit 2 which can be mounted integrally onto the apparatus body 1 so that the portable terminal apparatus 20 may additionally have a scanning function.

The laser scanner unit (optical reading unit) 2 performs, in response to an operation of a trigger key which will be hereinafter described, a scanning operation of irradiating light upon a predetermined reading object such as, for example, a bar code and receiving reflected light from the reading object to obtain read information of the bar code. The scanning operation (including lighting and extinction of a laser beam) is controlled by a trigger control section 14 provided in the laser scanner unit 2.

Figure 3:
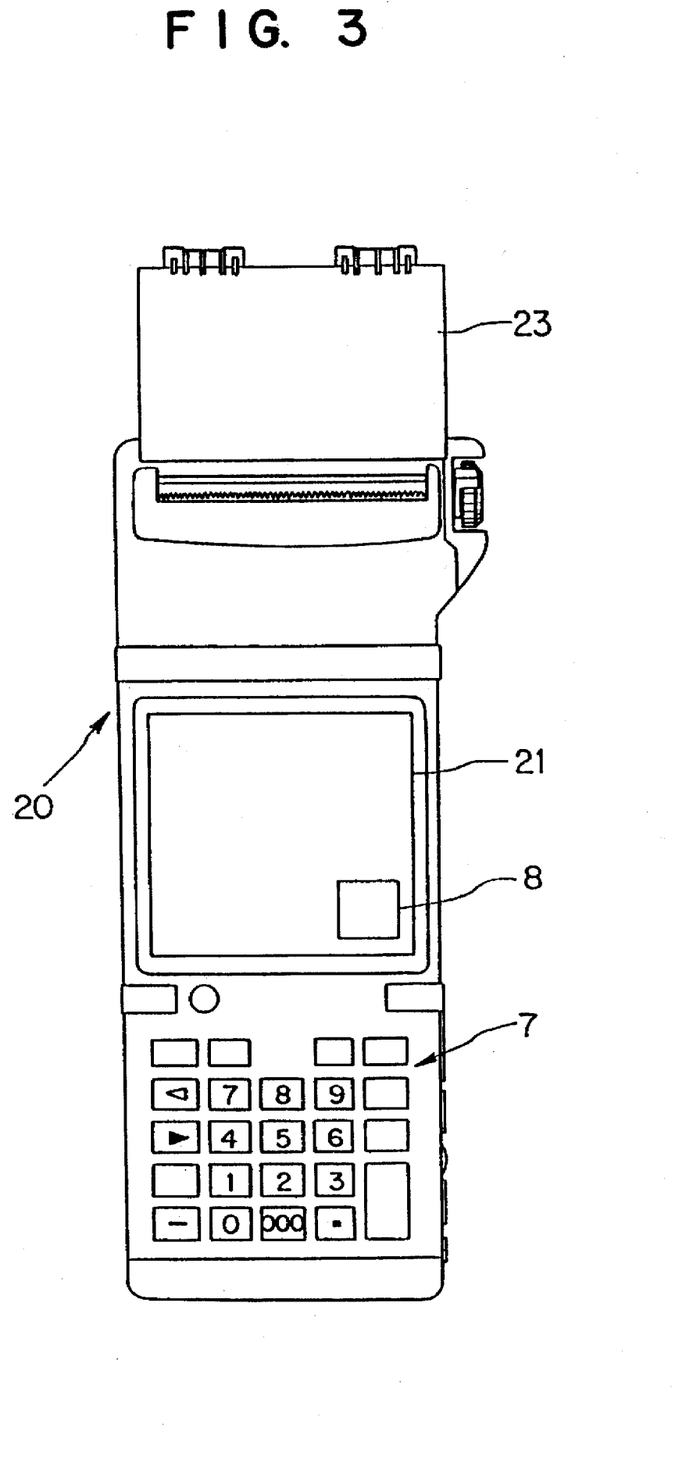
FIG. 3 is a plan view showing the apparatus body of the portable terminal apparatus shown in FIG. 1.

Meanwhile, referring to FIG. 3, the apparatus body 1 includes, as can be seen from an appearance thereof shown, a ten key section 7, a display section 21, a printer 23 and so forth. Referring back to FIG. 1, the apparatus body 1 further includes, as functions thereof, a CPU 3, a ROM 4, a RAM 5, a keyboard CPU 6, a ten key section 7, a touch panel section 8, a register 9, a serial section 10, a memory section 11, a power source section 12 and an open connector transistor 13.

The CPU 3 controls the entire portable terminal apparatus 20 and includes a timer 3A and a resetting processing section 3B which will be hereinafter described.

The ROM 4 has an initialization program and other necessary programs stored therein. The RAM 5 temporarily stores application execution data, user data and other necessary data. The keyboard CPU 6 controls the ten key section 7 and the touch panel section 8.

The ten key section 7 and the touch panel section 8 function as an inputting section for inputting processing information including data and operation instructions.

In particular, referring to FIG. 3, the ten key section (ten key set) 7 includes ten keys and some other required keys having several functions. Meanwhile, the touch panel section 8 is displayed with a predetermined area on the display section 21 on the apparatus body 1 and can input processing information by contacting it with a finger or a like element.

In the present embodiment, at least one of the keys of the ten key section 7, for example, an "inputting" key, has a function allocated thereto as a trigger key which is manually operated in order to start a scanning operation by the laser scanner unit 2.

Referring back to FIG. 1, the register 9 is set to "1" as trigger key operation information when the key allocated as the trigger key in the ten key section 7 is depressed. The register 9 is connected to the trigger control section 14 of the laser scanner unit 2 by way of the open collector transistor 13.

The open collector transistor 13 exhibits an on-state while "1" is held as trigger key operation information in the register 9. The open collector transistor 13 has a function as a reading operation driving section which changes, when it is put into an on-state, the potential at a position A at a preceding stage to the trigger control section 14 to 0 to activate the trigger control section 14 to perform a scanning operation (reading operation) of the laser scanner unit 2.

Accordingly, in the laser scanner unit 2, when the value in the register 9 is "1", a scanning operation to obtain read information of a predetermined reading object is performed under the control of the trigger control section 14.

The timer 3A of the CPU 3 counts a time elapsed after "1" is placed as trigger operation information into the register 9. The resetting processing section 3B erases the trigger key operation information "1" stored in the register 9 (in fact, resets the register 9 to "0") when the elapsed time counted by the timer 3A exceeds a predetermined supervisory time or when read information of a predetermined reading object is obtained by a scanning operation of the laser scanner unit 2 within the supervisory time.

The serial section 10 receives read information of a predetermined reading object from the laser scanner unit 2. The memory section 11 temporarily stores read information of a predetermined reading object from the serial section 10. The power source section 12 supplies electric power necessary to operate the portable terminal apparatus 20.

It is to be noted that the printer 23 shown in FIG. 3 prints processed information by the portable terminal apparatus 20.

Figure 4:
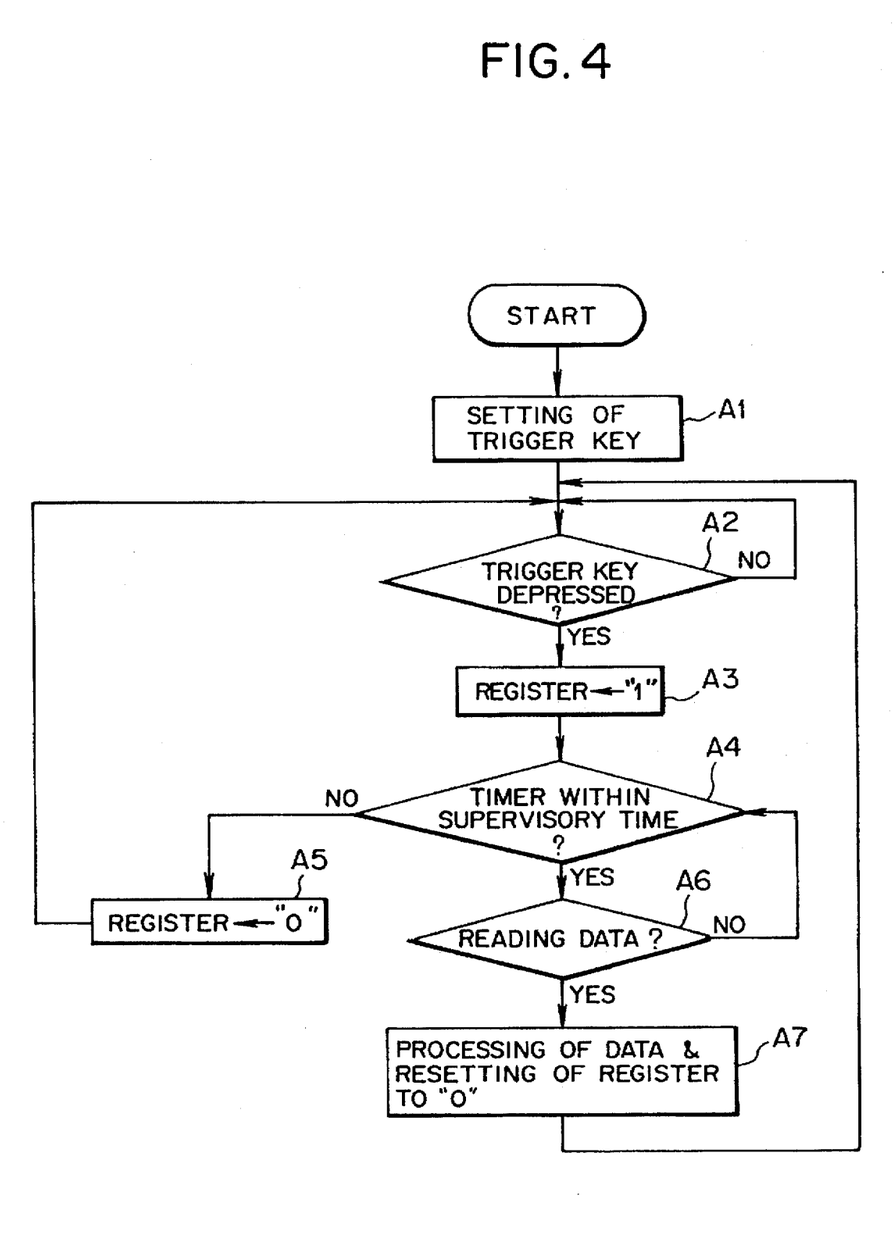
FIG. 4 is a flow chart illustrating operation of the portable terminal apparatus shown in FIG.

Operation of the portable terminal apparatus of the first embodiment of the present invention constructed in such a manner as described above will be described below with reference to a flow chart (steps A1 to A7) shown in FIG. 4.

First, in the present embodiment, a suitable key of the ten key section 7 of the portable terminal apparatus 20 is designated or allocated as a trigger key for the laser scanner unit 2 in advance (step A1). The allocation processing of the trigger key is normally performed in response to a request by a user before the portable terminal apparatus 20 is shipped to the user. Alternatively, however, each user may manually operate the ten key section 7 or the like in accordance with its will to perform such allocation of the trigger key.

Then, when the trigger key is manually operated, that is, when that one of the keys included in the ten key section 7 which has been allocated as the trigger key is manually operated (YES route at step A2), such operation is recognized by the CPU 3 by way of the keyboard CPU 6.

In the CPU 3, after the operation of the trigger key is recognized, the register 9 is set to "1" (step A3), and supervision of the time by the timer 3A is started (step A4), whereafter inputting of read information read by the laser scanner unit 2 to the serial section 10 is waited (step A6).

More particularly, when the timer 3A supervises the time within which "1" is set in the register 9, if reading of data is not performed within a fixed period of time, the resetting processing section 3B functions to reset the trigger key operation information "1" stored in the register 9 to "0" (step A5).

Then, the laser scanner unit 2 enters into and thereafter keeps its waiting condition for an instruction to start a scanning operation until the key of the ten key section 7 to which the function of the trigger key is allocated is depressed for the next time (step A2).

On the other hand, if reading of data is performed within the fixed period of time for which supervision is performed by the timer 3A at step A6, then the data thus read are stored once into the memory section 11 and then processed by the CPU 3 based on a result of the reading and the register 9 is reset to "0" by the resetting processing section 3B (step A7).

Then, the laser scanner unit 2 enters into and thereafter keeps its waiting condition for an instruction to start a scanning operation until the key of the ten key section 7 to which the function of the trigger key is allocated is depressed for the next time (step A2).

In this manner, with the portable terminal apparatus according to the first embodiment of the present invention, since a trigger key is set at a position where an operator can operate readily by allocating the trigger key of the laser scanner unit 2 to one of the keys of the ten key section 7 on the apparatus body 1, there is an advantage in that the operability is improved very much.

b. Second Embodiment of the Invention

A second preferred embodiment of the present invention will be described below with reference to the drawings.

Figure 5:
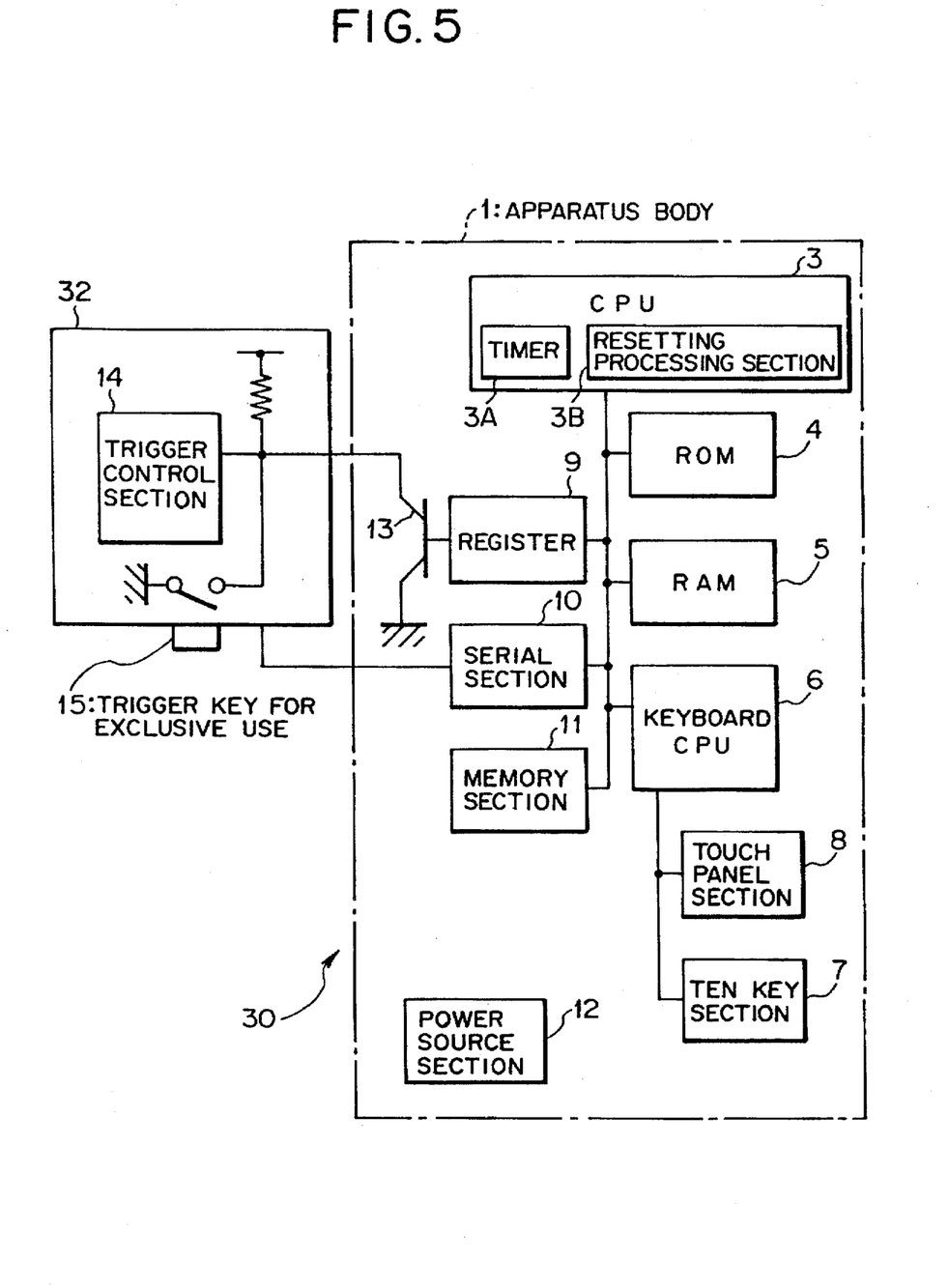
FIG. 5 is a block diagram of another portable terminal apparatus showing a second preferred embodiment of the present invention.

Referring to FIG. 5, there shown in block diagram a portable terminal apparatus according to the second preferred embodiment of the present invention. The portable terminal apparatus generally denoted at 30 is a modification to and different from the portable terminal apparatus 20 in the first embodiment in the construction of the apparatus body 1. In particular, while the apparatus body 1 of the portable terminal apparatus 30 has similar functions to those of the apparatus body 1 in the first embodiment described above, it is different from that in the first embodiment only in that a laser scanner unit 32 (optical reading unit), which is provided in place of the laser scanner unit 2, additionally includes a trigger key 15 for exclusive use installed thereon.

The trigger key 15 for exclusive use of the laser scanner unit 32 has an equivalent function to that of that one of the keys of the ten key section 7 of the apparatus body 1 which is allocated as the trigger key.

In particular, also when the trigger key 15 for exclusive use is depressed, the register 9 is set to "1" and a scanning operation to obtain read information of a predetermined reading object is performed similarly as upon depression of the key of the ten key section 7 which functions as the trigger key.

Figure 6:
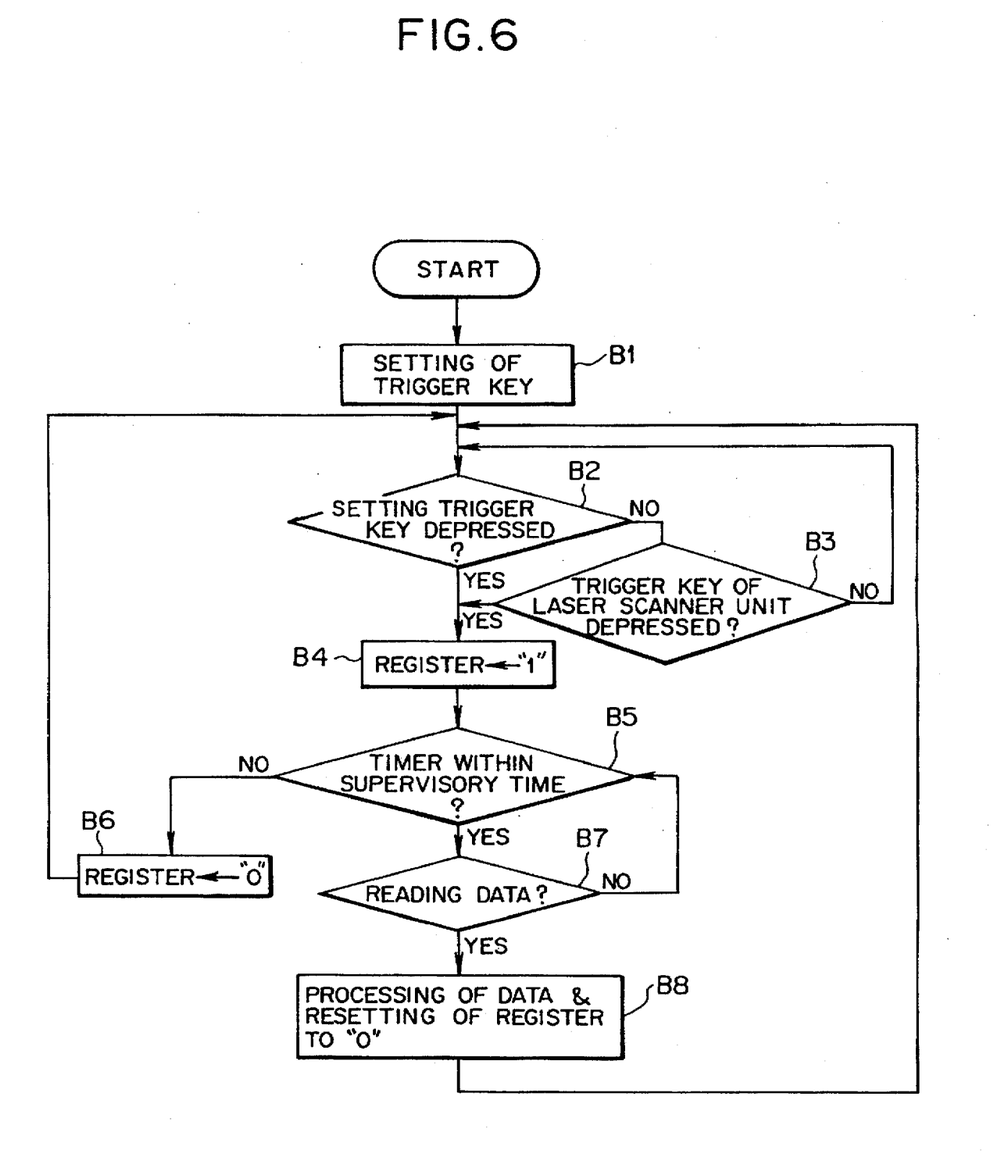
FIG. 6 is a flow chart illustrating operation of the portable terminal apparatus shown in FIG. 5.

Operation of the portable terminal apparatus of the second embodiment of the present invention having the construction described above will be described below with reference to a flow chart (steps B1 to B8) shown in FIG. 6.

First, also in the present embodiment, a suitable one of the keys of the ten key section 7 of the portable terminal apparatus 30 is allocated as the trigger key for the laser scanner unit 32 in advance (step B1).

Then, when any of the trigger keys is manually operated, that is, when that one of the keys included in the ten key section 7 which has been allocated as the trigger key is depressed (YES route at step B2) or when the trigger key 15 for exclusive use is depressed (YES route at step B3), such operation is recognized by the CPU 3 by way of the keyboard CPU 6.

In the CPU 3, after the operation of any trigger key is recognized, data of a predetermined reading object are read in a similar manner as at steps A3 to A7 in FIG. 4 described hereinabove.

In particular, the register 9 is set to "1" by the CPU 3 (step B4), and supervision of the time by the timer 3A is started (step B8), whereafter inputting of read information of bar code information to the serial section 10 is waited (step B7).

More particularly, if reading of data is not performed within the fixed period of time for supervision by the timer 3A, the resetting processing section 3B functions to reset the trigger key operation information "1" stored in the register 9 to "0" (step B6).

Then, the laser scanner unit 32 enters into and thereafter keeps its waiting condition for a scanning operation until the key of the ten key section 7 to which the function of the trigger key is allocated or the trigger key 15 for exclusive use is depressed for the next time (step B2 or from the NO route at step B2 to step B3).

On the other hand, if reading of data is performed with in the fixed period of time for which supervision is performed by the timer 3A at step B7, then the data thus read are stored once into the memory section 11 and then processed by the CPU 3 based on a result of the reading and the register 9 is reset to "0" by the resetting processing section 3B (step B8).

Thereafter, the laser scanner unit 32 enters into and thereafter keeps its waiting condition until the key of the ten key section 7 to which the function of the trigger key is allocated or the trigger key 15 for exclusive use is depressed for the next time similarly as described above (step B2 or from the NO route at step B2 to step B3).

In this manner, with the portable terminal apparatus according to the second embodiment of the present invention, even where the trigger key 15 for exclusive use is installed already on the laser scanner unit 32 when one of the keys of the ten key section 7 on the apparatus body 1 is allocated as the trigger key for the laser scanner unit 32, since the trigger key 15 for exclusive use has the same function as that of the key of the ten key section 7 which is allocated as the trigger key, the trigger key is set at a position where an operator can operate readily, and there is an advantage in that the operability is improved very much similarly as with the portable terminal apparatus according to the first embodiment described hereinabove. The portable terminal apparatus of the present embodiment is further advantageous in that, since the trigger key 15 for exclusive use and the trigger key allocated on the ten key section 7 can be alternatively used depending upon the situation, the operability is improved very much.

c. Others

While the function as a trigger key is allocated to at least one of the keys of the ten key section 7 in the embodiments described above, the present invention is not limited to the particular manner of allocation, and the function as a trigger key may alternatively be allocated to the touch panel section 8 displayed on the display section 21 of the apparatus body 1.

Further, while the laser scanner unit 2 or 32 wherein a laser beam is irradiated upon a predetermined reading object as an object of reading is employed as an optical reading unit in the embodiments described above, the present invention is not limited to the particular configuration, and an optical reading unit including an optical system of some other type may alternatively be employed as the optical reading unit.

The present invention is not limited to the specifically described embodiment, and variations and modifications may be made without departing from the scope of the present invention.

What is claimed is:

1. A portable terminal apparatus, comprising:

an apparatus body;

an inputting section provided on said apparatus body for inputting processing information including data and an operation instruction;

an optical reading unit mounted on said apparatus body for irradiating light upon a reading object and receiving reflected light from the reading object to obtain read information of the reading object, said portable terminal apparatus being additionally provided with a reading function as said optical reading unit is mounted integrally on said apparatus body;

a trigger key allocated on said inputting section of said apparatus body of being manually operated to start a reading operation by said optical reading unit;

a register for storing trigger key operation information when said trigger key is operated;

a reading operation driving section for causing said optical reading unit to perform the reading operation while the trigger key operation information is stored in said register;

a timer for counting a time elapsed after the trigger key operation information is stored into said register; and a resetting processing section for erasing the trigger key operation information stored in said register when the elapsed time counted by said timer exceeds a supervisory time or when read information of the reading object is obtained by the reading operation of said optical reading unit within the supervisory time.

2. A portable terminal apparatus as claimed in claim 1, wherein said inputting section includes a ten key set, and a function as said trigger key is allocated to at least one of keys of said ten key set so that the key may serve also as said trigger key.

3. A portable terminal apparatus as claimed in claim 2, wherein said optical reading unit includes a trigger key for exclusive use for being operated to start a reading operation by said optical reading unit, said trigger key for exclusive use having the same function as that of said trigger key allocated on said inputting section.

4. A portable terminal apparatus as claimed in claim 1, further comprising a display section provided on said apparatus body for displaying a touch panel as said inputting section thereof, and wherein said trigger key is allocated to said touch panel.

5. A portable terminal apparatus as claimed in claim 4, wherein said optical reading unit includes a trigger key for exclusive use for being operated to start a reading operation by said optical reading unit, said trigger key for exclusive use having the same function as that of said trigger key allocated on said inputting section.

6. A portable terminal apparatus as claimed in claim 1, wherein said optical reading unit includes a trigger key for exclusive use for being operated to start a reading operation by said optical reading unit, said trigger key for exclusive use having the same function as that of said trigger key allocated on said inputting section.

* * * * *